US012749463B2

(12) United States Patent
Kim et al.

(10) Patent No.: US 12,749,463 B2
(45) Date of Patent: Sep. 29, 2026

(54) POWER MANAGEMENT DEVICE

(71) Applicant: LX SEMICON CO., LTD., Daejeon (KR)

(72) Inventors: Seong Yong Kim, Daejeon (KR); In Ho Jeon, Daejeon (KR); Seung Hun Oh, Daejeon (KR); Won Suk Jang, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/971,650

(22) Filed: Dec. 6, 2024

(65) Prior Publication Data

US 2025/0191550 A1 Jun. 12, 2025

(30) Foreign Application Priority Data

Dec. 8, 2023 (KR) ........................ 10-2023-0177565
Aug. 14, 2024 (KR) ........................ 10-2024-0108780

(51) Int. Cl.
*G09G 3/36* (2006.01)
*G09G 3/34* (2006.01)

(52) U.S. Cl.
CPC ......... *G09G 3/3696* (2013.01); *G09G 3/3406* (2013.01); *G09G 2330/021* (2013.01)

(58) Field of Classification Search
CPC ...... H02M 3/157; H02M 3/158; H02M 1/007; H02M 1/083
See application file for complete search history.

(56) References Cited

U.S. PATENT DOCUMENTS

| | | | | |
|---|---|---|---|---|
| 8,421,364 | B2 | 4/2013 | Archibald et al. | |
| 2010/0134412 | A1* | 6/2010 | Narita | G06F 1/1649 345/156 |
| 2020/0014395 | A1* | 1/2020 | Chaput | H03M 1/466 |

FOREIGN PATENT DOCUMENTS

| | | | | |
|---|---|---|---|---|
| CN | 114448038 | A | * | 5/2022 |
| CN | 218603360 | U | * | 3/2023 |
| KR | 10-2010-0008353 | A | | 1/2010 |
| KR | 10-2019-0109533 | A | | 9/2019 |

* cited by examiner

*Primary Examiner* — Van N Chow
(74) *Attorney, Agent, or Firm* — POLSINELLI PC

(57) ABSTRACT

A power management device may include a first power conversion device configured to output a first driving voltage, a second power conversion device configured to output a second driving voltage, and a third power conversion device configured to output a third driving voltage. The first driving voltage may be changed in a range of positive voltage and the second driving voltage may be changed in a range of negative voltage. The third driving voltage may be smaller than the first driving voltage and greater than the second driving voltage, and may be changed as a driving voltage at a point where a sum of a first power consumption due to the changed first driving voltage and a second power consumption due to the changed second driving voltage is the smallest.

20 Claims, 7 Drawing Sheets

POWER MANAGEMENT DEVICE

CROSS-REFERENCE TO RELATED APPLICATIONS

The present application claims the priorities of Korean Patent Application No. 10-2023-0177565, filed on Dec. 8, 2023 and Korean Patent Application No. 10-2024-0108780, filed on Aug. 14, 2024, which are hereby incorporated by reference in their entirety.

BACKGROUND

Field of the Disclosure

The present disclosure relates to a power management device.

Description of the Background

A display device capable of displaying various information is widely used. A power management device is provided in the display device.

The power management device generates, controls, or manages various driving voltages provided to a display panel or a driving device. The power management device comprises a boost converter, a buck converter, and an inverting buck-boost converter to generate various driving voltages. The driving voltage comprises a positive driving voltage and a negative driving voltage.

The negative driving voltage is generated in an inverting buck-boost converter. Usually, an inverting buck-boost converter has a problem of very low efficiency, which increases power consumption. When the negative driving voltage is large, there is a problem of the internal voltage of the switch of the inverting buck-boost converter increasing, which increases power loss.

Meanwhile, various driving voltages are generated using a high-potential power supply and a low-potential power supply. In this instance, when the potential difference between the high potential power supply and the low potential power supply is large, there is a problem that the efficiency is lowered and the power consumption increases.

SUMMARY

Accordingly, the present disclosure is to solve the foregoing and other problems.

More specifically, the present disclosure is to provide a power management device capable of reducing power consumption by utilizing optimal power consumption.

The present disclosure is also to provide a power management device capable of reducing power consumption by improving efficiency.

Further, the present disclosure is to provide a power management device capable of reducing cost and reducing component size.

According to one aspect of the aspect to achieve the above or other objects, a power management device, comprising: a first power conversion device configured to output a first driving voltage; a second power conversion device configured to output a second driving voltage; and a third power conversion device configured to output a third driving voltage, wherein the first driving voltage is changed in a range of positive voltage and the second driving voltage is changed in a range of negative voltage, and wherein the third driving voltage is configured to be smaller than the first driving voltage and greater than the second driving voltage, and to be changed as a driving voltage at a point where a sum of a first power consumption due to the changed first driving voltage and a second power consumption due to the changed second driving voltage is the smallest.

When the third driving voltage is changed, the first driving voltage and the second driving voltage may be each changed.

The third power conversion device may comprise a low drop-output (LDO) regulator or a buck converter when the third driving voltage is changed to a positive voltage.

When the third driving voltage is changed to a positive voltage, the third driving voltage may be shared with at least one of a core voltage and an input/output voltage provided to a timing controller.

When the third driving voltage is changed to a negative voltage, the third driving voltage may comprise a negative LDO regulator or an inverting buck-boost converter.

The first driving voltage, the second driving voltage, and the third driving voltage may be power sources for generating a gamma voltage.

The power management device may further comprise a fourth power conversion device configured to output a fourth driving voltage. The fourth driving voltage may be supplied to a common electrode of a display panel, and when the third driving voltage is changed, the fourth driving voltage may be changed.

The power management device may further comprise a fifth power conversion device configured to output a fifth driving voltage; and a sixth power conversion device configured to output a sixth driving voltage. The fifth driving voltage and the sixth driving voltage may be voltages for switching control of a driving transistor of a display panel, and when the third driving voltage is changed, the fifth driving voltage and the sixth driving voltage may each be changed.

According to another aspect of the present disclosure to achieve the above or other, a power management device, comprising: a first power conversion device configured to output a first driving voltage; a second power conversion device configured to output a second driving voltage; a third power conversion device configured to output a third driving voltage that is smaller than the first driving voltage and greater than the second driving voltage; and a control device configured to control the first power conversion device, the second power conversion device, and the third power conversion device, wherein the first driving voltage is changed in a range of positive voltage and the second driving voltage is changed in a range of negative voltage, wherein the control device is configured: to change the third driving voltage as a driving voltage at a point where a sum of a first power consumption due to the changed first driving voltage and a second power consumption due to the changed second driving voltage is the smallest, to change the first driving voltage and the second driving voltage based on the changed third driving voltage, and to control the first power conversion device, the second power conversion device, and the third power conversion device so that the changed first driving voltage, the changed second driving voltage, and the changed third driving voltage are output, respectively.

The power management device may further comprise a fourth power conversion device configured to output a fourth driving voltage. The fourth driving voltage may be supplied to a common electrode of a display panel, the control device may change the fourth driving voltage based on the changed third driving voltage, and may control the fourth power conversion device so that the changed fourth driving voltage is output.

The effect of the power management device according to the aspect is described as follows.

According to at least one of the aspects, optimal power consumption may be obtained by using a third driving voltage located between a first driving voltage and a second driving voltage that change according to a change in the third driving voltage. Power consumption may be reduced by using the optimal power consumption.

According to at least one of the aspects, the absolute value of the fourth driving voltage (common voltage) or the sixth driving voltage (low gate voltage) decreases according to a change in the first driving voltage, so that power consumption may be reduced. In addition, the internal voltage of the switch of the fourth power conversion device or the sixth power conversion device may be reduced by the reduced fourth driving voltage or sixth driving voltage, thereby reducing power consumption.

According to at least one of the aspects, the third driving voltage may be shared with the core voltage or the input/output voltage, or the first driving voltage may be shared with the input voltage. Accordingly, a separate power conversion device for outputting the third driving voltage or the first driving voltage is not required, thereby reducing the cost and reducing the component size of the power management device.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

Figure 1:
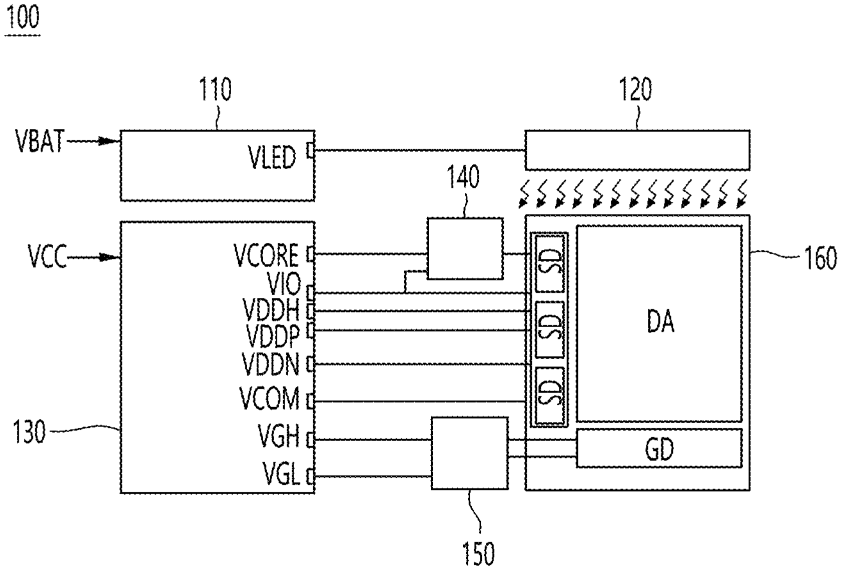
FIG. 1 illustrates a display device according to an aspect.

The sizes, shapes, dimensions, etc. of elements shown in the drawings may differ from actual ones. In addition, even if the same elements are shown in different sizes, shapes, dimensions, etc. between the drawings, this is only an example on the drawing, and the same elements have the same sizes, shapes, dimensions, etc. between the drawings.

DETAILED DESCRIPTION

Hereinafter, the aspect disclosed in this specification will be described in detail with reference to the accompanying drawings, but the same or similar elements are given the same reference numerals regardless of reference numerals, and redundant descriptions thereof will be omitted. The suffixes 'module' and 'unit' for the elements used in the following descriptions are given or used interchangeably in consideration of ease of writing the specification, and do not themselves have a meaning or role that is distinct from each other. In addition, the accompanying drawings are for easy understanding of the aspect disclosed in this specification, and the technical idea disclosed in this specification is not limited by the accompanying drawings. Also, when an element such as a layer, region or substrate is referred to as being 'on' another element, this means that there may be directly on the other element or be other intermediate elements therebetween.

FIG. 1 illustrates a display device according to an aspect.

Referring to FIG. 1, the display device 100 according to the aspect may comprise a power management device 130 and a display panel 160. The display device 100 according to the aspect may further comprise a timing controller 140, a level shifter 150, etc. The display device 100 according to the aspect may further comprise a backlight driving circuit 110, a backlight unit 120, etc. Although not illustrated, the display device 100 according to the aspect may further comprise a system board. The power management device 130 may be called a power management integrated circuit (PMIC), etc. The timing controller 140 may be called a control device, a T-CON, etc. The level shifter 150 may be called a voltage regulator, a voltage converter, etc. The backlight unit 120 may be called a backlight module, a backlight device, etc.

The drawing illustrates a power supply system. In the drawings for explaining the aspect, the illustration of transmission lines for data transmission between each component is omitted for the sake of understanding the aspect.

The system board performs internal operations using a system power source such as an adapter or a battery. The system board may provide a system voltage corresponding to the system power source to a control board. Here, the control board may comprise, for example, a power management device 130, a timing controller 140, a level shifter 150, a backlight driving circuit 110, etc., but is not limited thereto. The system voltage may comprise a first system voltage VCC, a second system voltage VBAT, etc.

For example, the power management device 130 may generate a core voltage VCORE, an input/output voltage VIO, first to third driving voltages VDDP, VDDN, and VDDH, which are power sources of a source driver SD, and an input/output voltage VIO or a separate power source, which is a logic power source, fifth and sixth driving voltages VGH and VGL, which are power sources of the level shifter, and a fourth driving voltage VCOM, which is a common voltage of the display panel 160, using the first system voltage VCC. In addition, the power management device 130 may output the first to third driving voltages VDDP, VDDN, and VDDH, which are the power supplies of the core voltage VCORE, the input/output voltage VIO and the source driver SD, the input/output voltage VIO or a separate power supply, which is the logic power supply, the fifth and sixth driving voltages VGH and VGL, which are the power supplies of the level shifter, and the fourth driving voltage VCOM, which is the common voltage of the display panel 160.

For example, the backlight driving circuit 110 may generate the backlight voltage VLED using the second system voltage VBAT and output the backlight voltage VLED. The backlight unit 120 may emit light using a plurality of light-emitting diodes using the backlight voltage VLED. The gradation of the image displayed on the display panel 160 may be expressed using the light from the plurality of light-emitting diodes. A plurality of light-emitting diodes may be provided in the backlight unit 120.

Meanwhile, the display panel 160 may display an image by performing an optical shutter operation for light provided from the backlight unit 120 for each pixel.

The display panel 160 may be provided with a display area DA for displaying an image. The display panel 160 may comprise a source driver SD and a gate driver GD. The source driver SD may be provided in plural, but is not limited thereto. The source driver SD and the gate driver GD may be disposed around the display area DA. The source driver SD and the gate driver GD may be mounted or built into the display panel 160. The gate driver GD may be called a gate driving device, a gate driving integrated circuit, etc., and the source driver SD may be called a source driving device, a source driving integrated circuit, etc.

A scan signal and a data voltage VD may be supplied to each pixel of the display area DA. For each pixel, a scan signal is applied from the gate driver GD to a gate line of the display area DA, and a data voltage VD is applied from the source driver SD to a data line of the display area DA, so that an image may be displayed on the display area DA.

Meanwhile, as described above, the power management device 130 may output the core voltage VCORE, the input/output voltage VIO, and the first to sixth driving voltages VDDP, VDDN, VDDH, VCOM, VGH, and VGL, etc.

For example, the core voltage VCORE may be supplied to the timing controller 140. For example, the input/output voltage VIO may be supplied to the timing controller 140 and the source driver SD. The core voltage VCORE and the input/output voltage VIO may be positive voltages greater than the ground voltage GND.

The timing controller 140 may use the core voltage VCORE to process internal display data and the input/output voltage VIO to drive buffers for receiving and transmitting data. The source driver SD may use the input/output voltage VIO to drive buffers for receiving and transmitting data. For example, the core voltage VCORE may be designed to have a lower level than the input/output voltage VIO for low-voltage driving of the timing controller 140, but is not limited thereto.

The timing controller 140 may generate a gate control signal, a source control signal, a backlight control signal, etc. using the core voltage VCORE, the input/output voltage VIO, etc. The backlight driving circuit 110 may generate a backlight voltage VLED using the backlight control signal. The gate driver GD may generate a scan signal using the gate control signal. The source driver SD may generate a data voltage VD using the source control signal.

For example, the first driving voltage VDDP, the second driving voltage VDDN, and the third driving voltage VDDH may be supplied to the source driver SD.

The first driving voltage VDDP, the second driving voltage VDDN, and the third driving voltage VDDH may be power sources for generating a gamma voltage. The source driver SD may supply a data voltage VD in which the gamma voltage is reflected to the display panel 160.

To this end, the source driver SD may generate the gamma voltage using the first driving voltage VDDP, the second driving voltage VDDN, and the third driving voltage VDDH. The voltage difference between the first driving voltage VDDP and the third driving voltage VDDH may be the same as the voltage difference between the second driving voltage VDDN and the third driving voltage VDDH, but is not limited thereto. For example, a positive gamma voltage may be generated using the first driving voltage VDDP and the third driving voltage VDDH. For example, a negative gamma voltage may be generated using the second driving voltage VDDN and the third driving voltage VDDH. For example, the third driving voltage VDDH may express 0 gradation, i.e., black gradation, and the first driving voltage VDDP or the second driving voltage VDDN may express 255 gradation, i.e., white gradation, but are not limited thereto. To express white gradation, a voltage smaller than the first driving voltage VDDP may be selected by using the first driving voltage VDDP, or a voltage greater than the second driving voltage VDDN may be selected by using the second driving voltage VDDN.

The display panel 160 may comprise a liquid crystal display panel. The liquid crystal display panel may be driven in an inversion manner to display an image by using a positive gamma voltage and a negative gamma voltage. For example, the source driver SD may alternately supply a first data voltage VD comprising a positive gamma voltage and a second data voltage VD comprising a negative gamma voltage to adjacent first and second data lines of the display panel 160. For example, the first data voltage VD may be supplied to the first data line and the second data voltage VD may be supplied to the second data line during a first horizontal period. For example, the second data voltage VD may be supplied to the first data line and the first data voltage VD may be supplied to the second data line during a second horizontal period following the first horizontal period.

The third driving voltage VDDH may be less than the first driving voltage VDDP. The third driving voltage VDDH may be greater than the second driving voltage VDDN. The first driving voltage VDDP may have a positive voltage greater than the ground voltage GND. The second driving voltage VDDN may have a negative voltage less than the ground voltage GND.

The third driving voltage VDDH may have one of the voltages of a positive voltage, a ground voltage GND, and a negative voltage. The third driving voltage VDDH may have an intermediate value between the first driving voltage VDDP and the second driving voltage VDDN. When the third driving voltage VDDH is determined, the first driving voltage VDDP and the second driving voltage VDDN may be changed to have a constant voltage difference from the third driving voltage VDDH.

For example, when the third driving voltage VDDH is determined as a ground voltage GND, 0V, the first driving voltage VDDP may be changed to 5V, and the second driving voltage VDDN may be changed to −5V. For example, when the third driving voltage VDDH is determined as a positive voltage, 2V, the first driving voltage VDDP may be changed to 7V, and the second driving voltage VDDN may be changed to −3V. For example, when the third driving voltage VDDH is determined as a negative voltage, −2V, the first driving voltage VDDP may be changed to 3V, and the second driving voltage VDDN may be changed to −7V. The aforementioned numerical values are for convenience of explanation and may be changed at any time.

Figure 9:
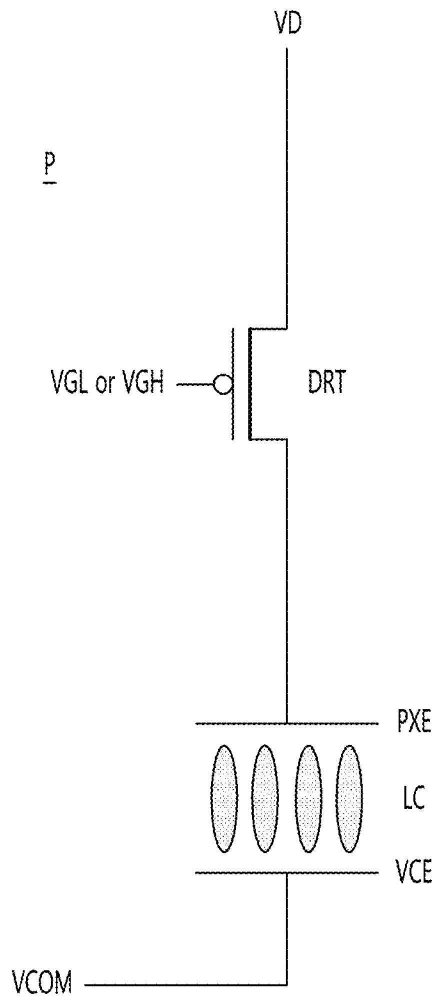
FIG. 9 illustrates pixels of a display panel according to an aspect.

Meanwhile, as illustrated in FIG. 9, the fourth driving voltage VCOM may be supplied to the display panel 160. The fourth driving voltage VCOM may be supplied to the common electrode VCE of the display panel 160 as a common voltage. The fourth driving voltage VCOM may be, for example, a negative voltage smaller than the ground voltage GND, but is not limited thereto. Hereinafter, the fourth driving voltage VCOM and the common voltage may be used interchangeably.

The aforementioned data voltage VD may be supplied to the pixel electrode PXE of the pixel P of the display panel 160. Therefore, the liquid crystal (LC) is displaced by the potential difference between the data voltage VD and the common voltage VCOM, so that the light transmittance may be adjusted, and the luminance of the image may be expressed.

Meanwhile, the fifth driving voltage VGH and the sixth driving voltage VGL may be supplied to the level shifter 150. The fifth driving voltage VGH and the sixth driving voltage VGL may be voltages for switching-controlling the driving transistor (DRT of FIG. 9) of the display panel 160. That is, the fifth driving voltage VGH may be a high gate voltage for turning on the driving transistor DRT, and the sixth driving voltage VGL may be a low gate voltage for turning off the driving transistor DRT. For example, the fifth driving voltage VGH may be a positive voltage greater than the ground voltage GND, and the sixth driving voltage VGL may be a negative voltage less than the ground voltage GND. The driving transistor DRT may be provided in each pixel P.

The level shifter 150 may adjust the levels of each of the fifth driving voltage VGH and the sixth driving voltage VGL, and then supply them to the gate driver GD. The gate driver GD may generate a scan signal based on the adjusted fifth driving voltage VGH and sixth driving voltage VGL, and supply the scan signal to the driving transistor DRT through the gate line of the display panel 160.

When the driving transistor DRT is turned on by a high level of the scan signal, the data voltage VD may be supplied to the pixel electrode PXE via the driving transistor DRT. Therefore, the liquid crystal (LC) may be displaced by the potential difference between the data voltage VD and the common voltage VCOM, so that an image having a predetermined luminance may be displayed. When the driving transistor DRT is turned off by the low level of the scan signal, the data voltage VD cannot be supplied to the pixel electrode PXE, so that an image is not displayed on the corresponding pixel P.

The high level of the scan signal may be called the fifth driving voltage VGH, and the low level of the scan signal may be called the sixth driving voltage VGL. Although not illustrated, the fifth driving voltage VGH and the sixth driving voltage VGL may be directly supplied to the gate driver GD, so that the level shifter 150 may be omitted.

Meanwhile, the power management device 130 may comprise a plurality of power conversion devices to generate the core voltage VCORE, the input/output voltage VIO, the first to sixth driving voltages VDDP, VDDN, VDDH, VCOM, VGH, and VGL. The power conversion devices may comprise a boost converter, a buck converter, an inverting buck-boost converter, a low drop-output (LDO) regulator, a negative LDO regulator, an amplifier-type converter, a comparator-type converter, etc.

The first driving voltage VDDP, the second driving voltage VDDN, and the fourth to sixth driving voltages VCOM, VGH, and VGL may be changed according to the third driving voltage VDDH. That is, when the third driving voltage VDDH is changed, the first driving voltage VDDP, the second driving voltage VDDN, and the fourth to sixth driving voltages VCOM, VGH, and VGL may be changed based on the third driving voltage VDDH.

For example, the second driving voltage VDDN, the fourth driving voltage VCOM, and the sixth driving voltage VGL having negative voltages may each be generated by the inverting buck-boost converter.

Since the value of the second driving voltage VDDN or the sixth driving voltage VGL generated in the inverting buck-boost converter is large, a large power consumption occurs in the inverting buck-boost converter. In addition, since the value of the second driving voltage VDDN or the sixth driving voltage VGL is large, the internal voltage of the switch provided in the inverting buck-boost converter is large, which causes a large power loss. Therefore, a method for improving efficiency and reducing power consumption or power loss is urgently needed.

According to the aspect, an optimal third driving voltage VDDH that may minimize power consumption may be obtained by considering the total power consumption by the first driving voltage VDDP and the second driving voltage VDDN. Based on the third driving voltage VDDH obtained in this way, the first driving voltage VDDP, the second driving voltage VDDN, and the fourth to sixth driving voltages VCOM, VGH, and VGL may be changed. This will be described in detail later.

Figure 2:
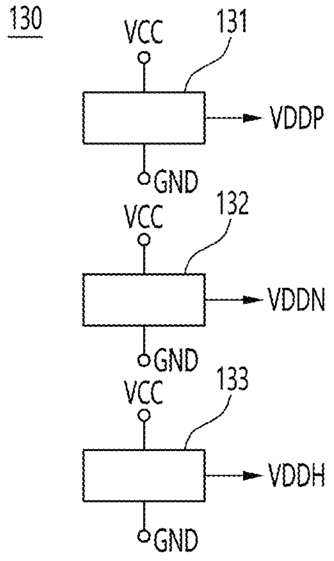
FIG. 2 is a block diagram illustrating a power management device according to a first aspect.

FIG. 2 is a block diagram illustrating a power management device according to a first aspect.

Referring to FIG. 1 and FIG. 2, the power management device 130 according to the first aspect may comprise a first power conversion device 131, a second power conversion device 132, a third power conversion device 133, etc.

The first power conversion device 131 may output a first driving voltage VDDP. The first power conversion device 131 may generate and output a first driving voltage VDDP using the first system voltage VCC, i.e., the input voltage, and the ground voltage GND as power sources. The second power conversion device 132 may generate and output a second driving voltage VDDN using the first system voltage VCC and the ground voltage GND as power sources. The third power conversion device 133 may generate and output a third driving voltage VDDH using the first system voltage VCC and the ground voltage GND as power sources.

The first driving voltage VDDP may be greater than the third driving voltage VDDH, and the second driving voltage VDDN may be less than the third driving voltage VDDH. The first driving voltage VDDP, the second driving voltage VDDN, and the third driving voltage VDDH may be power sources for generating a gamma voltage. That is, the source driver SD may generate a gamma voltage using the first driving voltage VDDP, the second driving voltage VDDN, and the third driving voltage VDDH as power sources.

For example, the first driving voltage VDDP may have a positive voltage, the second driving voltage VDDN may have a negative voltage, and the third driving voltage VDDH may have an intermediate value between the first driving voltage VDDP and the second driving voltage VDDN. For example, when the third driving voltage VDDH has a ground voltage GND, the first driving voltage VDDP and the second driving voltage VDDN may have values that are symmetrical to each other with respect to the third driving voltage VDDH. That is, when the third driving voltage VDDH is 0V, the first driving voltage VDDP may have 5V and the second driving voltage VDDN may be −5V. The aforementioned numerical values are for convenience of explanation and may be changed at any time.

The third driving voltage VDDH may be determined, set, or changed so that the total power consumption is the smallest by using the first driving voltage VDDP and the second driving voltage VDDN.

As described above, when the third driving voltage VDDH is changed, the first driving voltage VDDP and the second driving voltage VDDN may also be changed.

Figure 3:
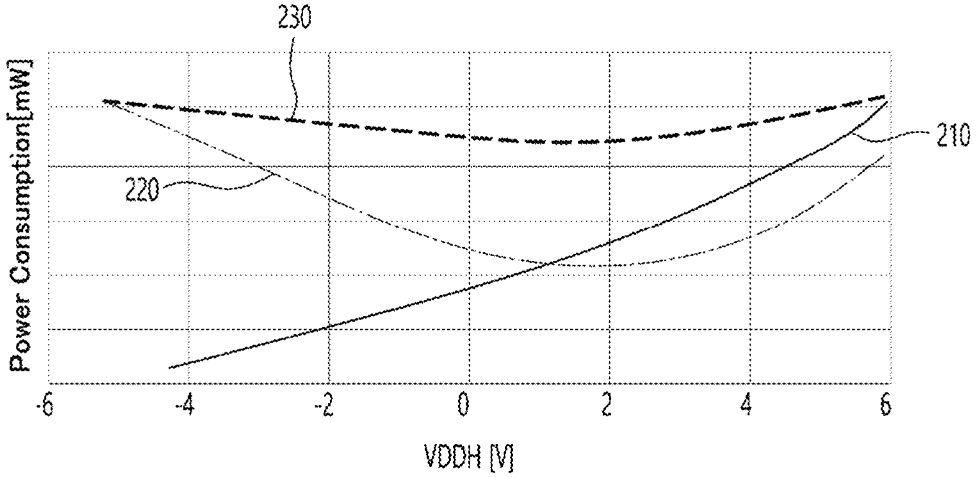
FIG. 3 illustrates the first power consumption, the second power consumption, and the sum of the first power consumption and the second power consumption that change according to the third driving voltage.

As illustrated in FIG. 3, when the third driving voltage VDDH is changed to increase, the first driving voltage VDDP may be changed to increase and the absolute value of the second driving voltage VDDN may be changed to decrease. In this instance, the first power consumption 210 due to the first driving voltage VDDP may increase, and the second power consumption 220 due to the second driving voltage VDDN may decrease. Each of the first power consumption 210 and the second power consumption 220 illustrated in FIG. 3 may be only an example, and may have a curve rather than a straight line.

In terms of power consumption, the first power consumption 210 and the second power consumption 220 may have a trade-off relationship. In contrast, the total power consumption, i.e., the sum of the first power consumption 210 and the second power consumption 220, 230, may vary depending on the curve shape of the first power consumption 210 and the curve shape of the second power consumption 220. That is, the total power consumption may not be maintained at a specific power consumption level, but may have a difference in level. In other words, the total power consumption may have the largest point and the smallest point. When the total power consumption has a constant level, the total power consumption may have a constant level according to the variation of the third driving voltage VDDH.

As illustrated in FIG. 3, when the total power consumption 230 does not have a constant level, the third driving voltage VDDH may be determined, set, or changed as a driving voltage at the point where the total power consumption 230 is the smallest. Based on the changed third driving voltage VDDH, each of the first driving voltage VDDP and the second driving voltage VDDN may be changed or adjusted. Therefore, the sum of the first power consumption 210 due to the first driving voltage VDDP and the second power consumption 220 due to the second driving voltage VDDN may be the point where the total power consumption 230 is the smallest, that is, the smallest total power consumption. This smallest total power consumption may be the optimal power consumption. For example, the point where the total power consumption 230 is the smallest may be the point where the third driving voltage VDDH is approximately 1 V.

According to the aspect, the optimum power consumption may be obtained by utilizing the fact that the first driving voltage VDDP and the second driving voltage VDDN change according to the variation of the third driving voltage VDDH. The optimum power consumption may be the lowest point in the total power consumption 230 that changes according to the variation of the third driving voltage VDDH, as illustrated in FIG. 3. Thus, the driving voltage at the point where the total power consumption 230 is the lowest may be determined, set, or changed to the third driving voltage VDDH, and the first driving voltage VDDP and the second driving voltage VDDN may be changed based on the changed first driving voltage VDDH. Therefore, the changed first driving voltage VDDP, the changed second driving voltage VDDN, and the third driving voltage VDDH may be output from the first power conversion device 131, the second power conversion device 132, and the third power conversion device 133, respectively, so that the power consumption may be reduced.

Figure 4:
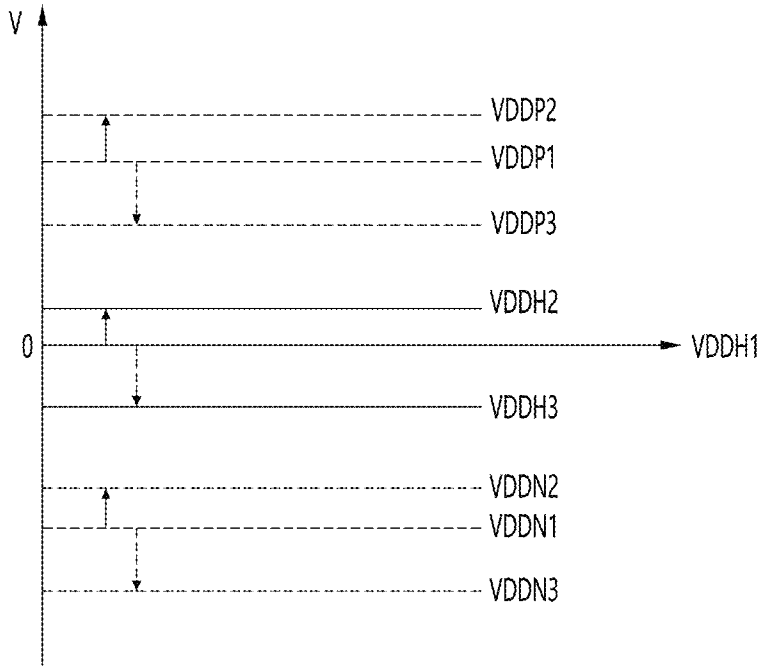
FIG. 4 illustrates the change relationship of the first driving voltage, the second driving voltage, and the third driving voltage.

FIG. 4 illustrates a change relationship between the first driving voltage, the second driving voltage, and the third driving voltage.

As illustrated in FIGS. 3 and 4, when the third driving voltage VDDH is changed to increase from VDDH1 to VDDH2, the first driving voltage VDDP may be changed to increase from VDDP1 to VDDP2, and the second driving voltage VDDN may be changed to decrease from the absolute value of VDDN1 to the absolute value of VDDN2. Accordingly, the first driving voltage VDDP may be increased, thereby increasing the first power consumption 210, while the absolute value of the second driving voltage VDDN may be decreased, thereby decreasing the second power consumption 220.

When the third driving voltage VDDH is changed to decrease from VDDH1 to VDDH3, the first driving voltage VDDP may be changed to decrease from VDDP1 to VDDP3, and the second driving voltage VDDN may be changed to increase from the absolute value of VDDN1 to the absolute value of VDDN3. Accordingly, the first driving voltage VDDP may be decreased, thereby decreasing the first power consumption 210, while the absolute value of the second driving voltage VDDN may be increased, thereby increasing the second power consumption 220.

In the drawing, the third driving voltage VDDH at the point where the total power consumption is the smallest may be a positive voltage, but it may also be a negative voltage or a ground voltage GND. As described above, when the first power consumption 210 and the second power consumption 220 have an asymmetrical trade-off relationship, the third driving voltage VDDH at the point where the total power consumption is the smallest may be determined, set, or changed among a negative voltage, a ground voltage GND, or a positive voltage.

When the total power consumption is changed to the third driving voltage VDDH at the smallest point, the first driving voltage VDDP and the second driving voltage VDDN may be changed based on the third driving voltage VDDH. The first driving voltage VDDP may be changed in the range of positive voltage, and the second driving voltage VDDN may be changed in the range of negative voltage.

Therefore, the third driving voltage VDDH may be determined, set, or changed as a driving voltage at the point where the sum 230 of the first power consumption 210 due to the first driving voltage VDDP and the second power consumption 220 due to the second driving voltage VDDN is smallest, and the first driving voltage VDDP and the second driving voltage VDDN may be changed based on the changed third driving voltage VDDH. In this instance, the power consumption generated in the first power conversion device 131, the second power conversion device 132, and the third power conversion device 133 may be minimized, so that the power consumption may be significantly reduced.

Figure 5:
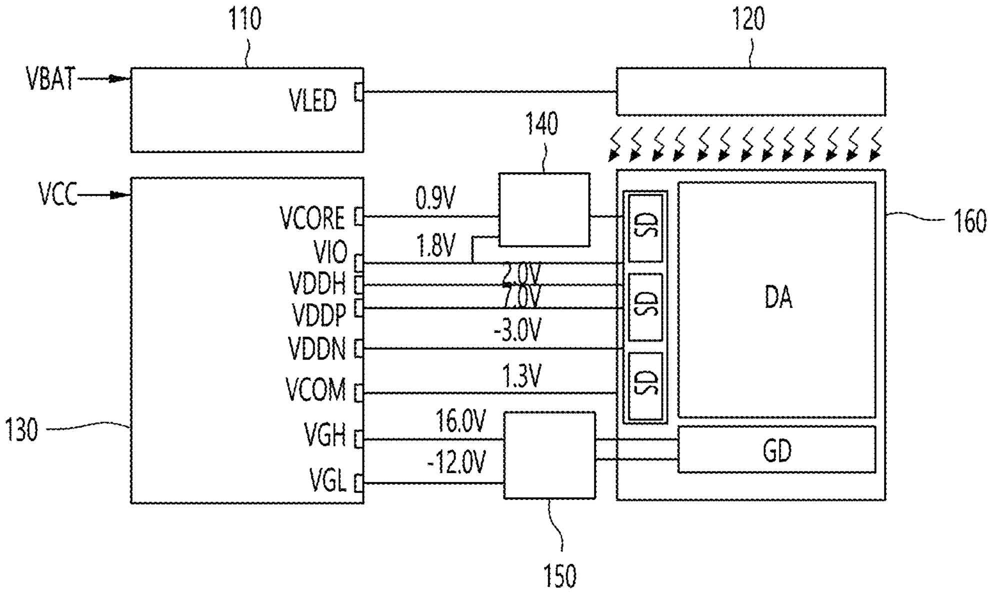
FIG. 5 illustrates a first example in which the third driving voltage is changed to a positive voltage.

FIG. 5 illustrates a first example in which the third driving voltage is changed to a positive voltage.

As illustrated in FIGS. 2, 3, and 5, the third driving voltage VDDH may be determined, set, or changed to a positive voltage as a driving voltage at a point where the total power consumption is the smallest. To generate the third driving voltage VDDH having a positive voltage, the third power conversion device 133 may comprise an LDO regulator or a buck converter.

Based on the changed third driving voltage VDDH, other driving voltages, that is, the first driving voltage VDDP, the second driving voltage VDDN, and the fourth to sixth driving voltages VCOM, VGH, and VGL, may be changed. When the third driving voltage VDDH increases, the first driving voltage VDDP, the second driving voltage VDDN, and the fourth to sixth driving voltages VCOM, VGH, and VGL may also increase.

In this instance, since the first driving voltage VDDP increases in the range of positive voltages, the first power consumption 210 due to the first driving voltage VDDP increases, but since the absolute value of the second driving voltage VDDN decreases in the range of negative voltages, the second power consumption 220 due to the second driving voltage VDDN may decrease.

Therefore, since the sum 230 of the first power consumption 210 and the second power consumption 220 has the smallest level in the changed third driving voltage VDDH, the total power consumption of the power management device 130 may decrease. In addition, since the absolute value of the fourth driving voltage VCOM or the sixth driving voltage VGL is also reduced in the range of negative voltage, the power consumption due to the fourth driving voltage VCOM or the sixth driving voltage VGL may be reduced. In addition, since the absolute value of the second driving voltage VDDN is reduced in the range of negative voltage, the internal voltage of the switch of the second power conversion device 132 may be reduced, thereby reducing the power consumption.

Figure 6:
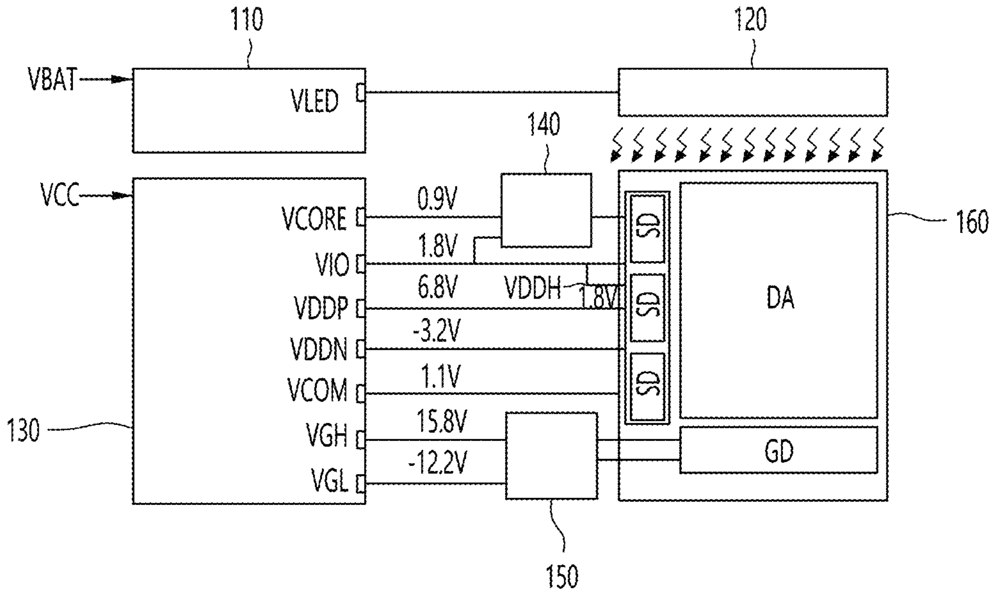
FIG. 6 illustrates a second example in which the third driving voltage is changed to a positive voltage and is shared with the input/output voltage.

FIG. 6 illustrates a second example in which the third driving voltage is changed to a positive voltage and is shared with the input/output voltage.

As illustrated in FIG. 2, FIG. 3, and FIG. 6, the third driving voltage VDDH may be determined, set, or changed to a positive voltage as the driving voltage at the point where the total power consumption is the smallest.

When the changed third driving voltage VDDH is equal to the input/output voltage VIO, the third power conversion device 133 does not need to be provided to generate the third driving voltage VDDH. That is, the third driving voltage VDDH may be shared with the input/output voltage VIO.

Although not illustrated in the drawing, when the changed third driving voltage VDDH is the same as the core voltage VCORE, there is no need for the third power conversion device 133 to be provided to generate the third driving voltage VDDH. That is, the third driving voltage VDDH may be shared with the core voltage VCORE.

Therefore, when the core voltage VCORE and the input/output voltage VIO or the logic power of the source driver are used and the third driving voltage VDDH is the same as the core voltage VCORE or the input/output voltage VIO, there is no need for the third power conversion device 133 to be provided to generate the third driving voltage VDDH, so that the cost may be reduced and the component size of the power management device 130 may be reduced. In addition, when the core voltage VCORE and the input/output voltage VIO or the logic power of the source driver are used and the third driving voltage VDDH is the same as the logic power of the source driver, the third power conversion device 133 does not need to be provided, and the pin of the source driver SD is not added, so that the cost may be reduced.

Figure 7:
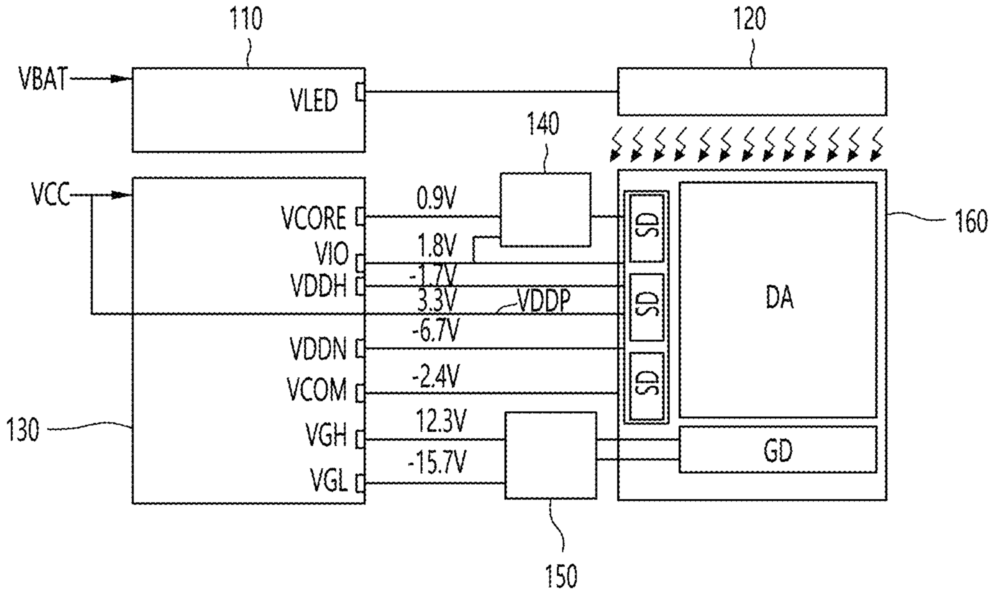
FIG. 7 illustrates a third example in which the third driving voltage is changed to a negative voltage.

FIG. 7 illustrates a third example in which the third driving voltage is changed to a negative voltage.

As illustrated in FIG. 2, FIG. 3, and FIG. 7, the third driving voltage VDDH may be determined, set, or changed to a negative voltage as a driving voltage at a point where the total power consumption is the smallest. To generate the third driving voltage VDDH having a negative voltage, the third power conversion device 133 may comprise a negative LDO regulator or an inverting buck-boost converter.

Based on the changed third driving voltage VDDH, other driving voltages, i.e., the first driving voltage VDDP, the second driving voltage VDDN, and the fourth to sixth driving voltages VCOM, VGH, and VGL, may be changed. When the third driving voltage VDDH is reduced, the first driving voltage VDDP, the second driving voltage VDDN, and the fourth to sixth driving voltages VCOM, VGH, and VGL may also be reduced.

The reduced first driving voltage VDDP may be the same as the first system voltage VCC. In this instance, the reduced first driving voltage VDDP may be shared with the first system voltage VCC. Accordingly, since the first power conversion device 131 for outputting the first driving voltage VDDP does not need to be provided, the cost may be reduced and the component size of the power management device 130 may be reduced.

Since the first driving voltage VDDP decreases in the range of positive voltage, the first power consumption 210 due to the first driving voltage VDDP decreases, but since the absolute value of the second driving voltage VDDN increases in the range of negative voltage, the second power consumption 220 due to the second driving voltage VDDN may increase.

Since the sum 230 of the first power consumption 210 and the second power consumption 220 has the smallest level in the changed third driving voltage VDDH, the total power consumption of the power management device 130 may be reduced.

Figure 8:
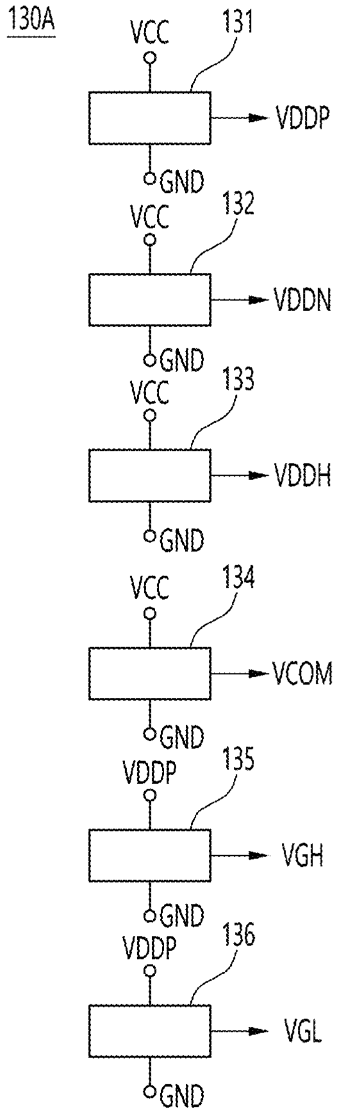
FIG. 8 is a block diagram illustrating a power management device according to a second aspect.

FIG. 8 is a block diagram illustrating a power management device according to a second aspect. The description omitted in the second aspect may be easily understood from the first aspect (FIG. 2).

Referring to FIG. 1, FIG. 3, and FIG. 8, the power management device 130A according to the second aspect may comprise a first power conversion device 131, a second power conversion device 132, a third power conversion device 133, a fourth power conversion device 134, a fifth power conversion device 135, a sixth power conversion device 136, etc.

The first to sixth power conversion devices 131 to 136 may output first to sixth driving voltages VDDP, VDDN, VDDH, VCOM, VGH, and VGL, respectively.

The first to fourth power conversion devices 131 to 134 may generate and output first to fourth driving voltages VDDP, VDDN, VDDH, and VCOM, respectively, using the first system voltage VCC and the ground voltage GND as power sources.

The fifth power conversion device 135 and the sixth power conversion device 136 may generate and output the fifth driving voltage VGH and the sixth driving voltage VGL, respectively, by using the first driving voltage VDDP and the ground voltage GND as power sources.

Therefore, since the fifth driving voltage VGH and the sixth driving voltage VGL each have a large voltage level, the efficiency of each of the first to fourth power conversion devices 131 to 134 may be reduced. To solve this problem, the first driving voltage VDDP, which is greater than the first system voltage VCC, may be used as the power source of each of the fifth power conversion device 135 and the sixth power conversion device 136, thereby improving efficiency and reducing power consumption.

Meanwhile, the third driving voltage VDDH may be determined, set, or changed as a driving voltage at the point where the sum of the first power consumption 210 due to the first driving voltage VDDP and the second power consumption 220 due to the second driving voltage VDDN, 230, is the smallest. Accordingly, the first driving voltage VDDP, the second driving voltage VDDN, and the fourth to sixth driving voltages VCOM, VGH, and VGL, respectively, may be changed according to the changed third driving voltage VDDH.

Accordingly, since the third driving voltage VDDH is determined at the point where the sum 230 of the first power consumption 210 and the second power consumption 220 is the smallest, the power consumption in all of the first to sixth power conversion devices 131 to 136 may be significantly reduced. In addition, since the absolute values of the second driving voltage VDDN, the fourth driving voltage VCOM, and the sixth driving voltage VGL having negative voltages are reduced, the power consumption due to each of the second driving voltage VDDN, the fourth driving voltage VCOM, and the sixth driving voltage VGL may be reduced. In addition, the internal voltage of each of the switches of the second power conversion device 132, the fourth power conversion device 134, and the sixth power conversion device 136 may be reduced, so that the power consumption may be reduced.

Meanwhile, the fourth driving voltage VCOM may be supplied to the common electrode VCE of each pixel of the display panel 160 as a common voltage, as illustrated in FIG. 9. The fifth driving voltage VGH and the sixth driving voltage VGL may be used to switch-control the driving transistor DRT of each pixel of the display panel 160 as the high gate voltage and the low gate voltages, respectively. The fifth driving voltage VGH and the sixth driving voltage VGL may be supplied directly to the driving transistor DRT, with or without passing through the level shifter 150 illustrated in FIG. 1.

Meanwhile, the fourth power conversion device 134 may comprise an amplifier-type converter, a comparator-type converter, etc.

Depending on the variation of the third driving voltage VDDH, the fourth driving voltage VCOM may vary to a ground voltage GND, a positive voltage, or a negative voltage.

When the fourth driving voltage VCOM is a positive voltage, the first system voltage VCC or the first driving voltage VDDP may be used as a high-potential power source of the fourth power conversion device 134, and the ground voltage GND or the second driving voltage VDDN may be used as a low-potential power source of the fourth power conversion device 134.

When the fourth driving voltage VCOM is a ground voltage GND, the first system voltage VCC or the first driving voltage VDDP may be used as a high-potential power source of the fourth power conversion device 134, and the second driving voltage VDDN may be used as a low-potential power source of the fourth power conversion device 134. When the fourth power conversion device 134 comprises an amplifier-type converter and the fourth driving voltage VCOM is a ground voltage GND, the first system voltage VCC or the first driving voltage VDDP may be used as a high-potential power source of the fourth power conversion device 134, and the ground voltage GND may be used as a low-potential power source of the fourth power conversion device 134.

When the fourth driving voltage VCOM is a negative voltage, the input/output voltage VIO, the core voltage VCORE, the first system voltage VCC or the first driving voltage VDDP may be used as a high-potential power source of the fourth power conversion device 134, and the second driving voltage VDDN may be used as a low-potential power source of the fourth power conversion device 134.

Meanwhile, the operation in the comparator-type converter may be divided into a static path, a sourcing path, a sinking path, etc.

A steady state level may be created. Afterwards, when the target voltage and the feedback voltage become similar, the switch is turned on so that the voltage may be maintained. When the feedback voltage is smaller (or lower) than the target voltage, a switch of the first driving voltage VDDP side supplied as a high-potential power source may be sourced. When the feedback voltage is larger (or higher) than the target voltage, a switch of the second driving voltage VDDN side supplied as a low-potential power source may be sunk.

Meanwhile, when the feedback voltage is the same as the target voltage, direct connection is also possible.

When using an amplifier-type converter, when a high-potential power source and a low-potential power source close to the target are used, the internal voltage of the switch of the converter may be reduced and the load capacity may also be reduced, so that the power consumption may be reduced.

Figure 10:
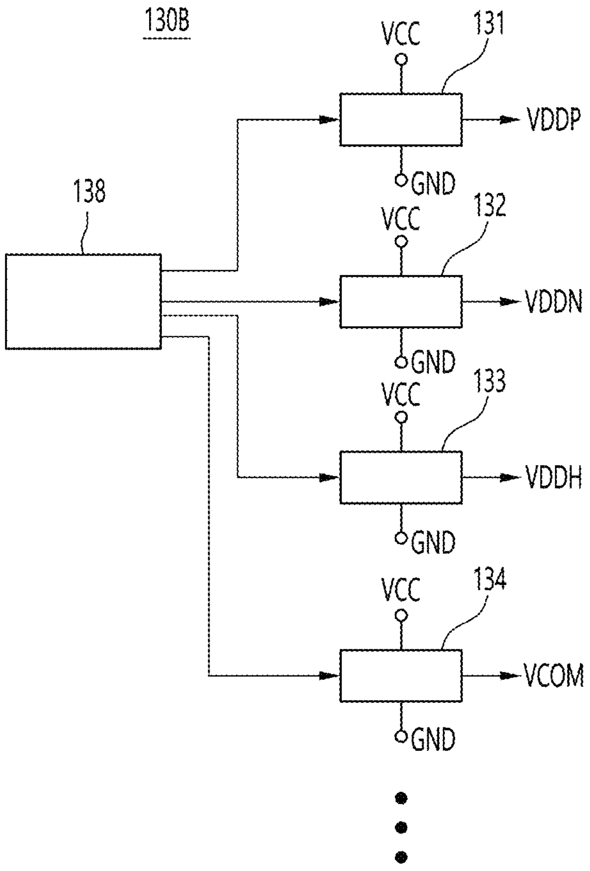
FIG. 10 is a block diagram illustrating a power management device according to a third aspect.

FIG. 10 is a block diagram illustrating a power management device according to the third aspect.

Referring to FIGS. 1 to 3 and FIG. 10, the power management device 130B according to the third aspect may comprise a first power conversion device 131, a second power conversion device 132, a third power conversion device 133, a fourth power conversion device 134, a control device 138, etc.

The first power conversion device 131, the second power conversion device 132, the third power conversion device 133, and the fourth power conversion device 134 may output a first driving voltage VDDP, a second driving voltage VDDN, a third driving voltage VDDH, and a fourth driving voltage VCOM, respectively. The first power conversion device 131, the second power conversion device 132, the third power conversion device 133, and the fourth power conversion device 134 may generate and output a first driving voltage VDDP, a second driving voltage VDDN, a third driving voltage VDDH, and a fourth driving voltage VCOM, respectively, using the first system voltage VCC and the ground voltage GND as power sources.

The control device 138 may control the first power conversion device 131, the second power conversion device 132, the third power conversion device 133, and the fourth power conversion device 134. The control device 138 may control the first power conversion device 131, the second power conversion device 132, the third power conversion device 133, and the fourth power conversion device 134 to output the first driving voltage VDDP, the second driving voltage VDDN, the third driving voltage VDDH, and the fourth driving voltage VCOM, respectively.

The control device 138 may provide a pulse signal as a control signal to each of the first power conversion device 131, the second power conversion device 132, the third power conversion device 133, and the fourth power conversion device 134. The first power conversion device 131, the second power conversion device 132, the third power conversion device 133, and the fourth power conversion device 134 may output a first driving voltage VDDP, a second driving voltage VDDN, a third driving voltage VDDH, and a fourth driving voltage VCOM by controlling the switching of switches according to the pulse signal, respectively.

Meanwhile, the control device 138 may determine, set, or change the third driving voltage VDDH as a driving voltage at a point where the sum 230 of the first power consumption 210 due to the changed first driving voltage VDDP and the second power consumption 220 due to the changed second driving voltage VDDN is the smallest, as illustrated in FIG. 3. The third driving voltage VDDH may be a positive voltage, a ground voltage GND, or a negative voltage.

To this end, the control device 138 may change the first driving voltage VDDP and the second driving voltage VDDN according to the change of the third driving voltage VDDH, and may obtain change information of the first power consumption 210 due to the changed first driving voltage VDDP and the second power consumption 220 due to the changed second driving voltage VDDN, respectively. The control device 138 may obtain change information of the sum 230 of the first power consumption 210 and the second power consumption 220, i.e., the total power consumption, according to the change of the third driving voltage VDDH. The control device 138 may determine, set, or change the third driving voltage VDDH based on the conversion information of the sum 230 of the first power consumption 210 and the second power consumption 220 obtained above, as a driving voltage at the point where the sum 230 of the first power consumption 210 and the second power consumption 220 obtained above is the smallest.

The control device 138 may change the first driving voltage VDDP, the second driving voltage VDDN, and the fourth driving voltage VCOM, respectively, based on the changed third driving voltage VDDH. The first driving voltage VDDP may be changed in a range of positive voltage, and the second driving voltage VDDN may be changed in a range of negative voltage. The control device 138 may control the first power conversion device 131, the second power conversion device 132, the third power conversion device 133, and the fourth power conversion device 134, so that the changed first driving voltage VDDP, the changed second driving voltage VDDN, the changed third driving voltage VDDH, and the changed fourth driving voltage VCOM are output, respectively.

To this end, the control device 138 may generate a first control signal, a second control signal, a third control signal, and a fourth control signal. The first power conversion device 131 may output the changed first driving voltage VDDP in response to the first control signal. The second power conversion device 132 may output the changed second driving voltage VDDN in response to the second control signal. The third power conversion device 133 may output the changed third driving voltage VDDH in response to the third control signal. The fourth power conversion device 134 may output the changed fourth driving voltage VCOM in response to the fourth control signal.

Meanwhile, the power management device 130B according to the third aspect may further comprise the fifth power conversion device 135, the sixth power conversion device 136, etc., as illustrated in FIG. 8. The control device 138 may control the fifth power conversion device 135 and the sixth power conversion device 136, respectively, to output the fifth driving voltage VGH and the sixth driving voltage VGL, respectively. When the control device 138 changes the third driving voltage VDDH, the control device 138 may change the fifth driving voltage VGH and the sixth driving voltage VGL, respectively, based on the changed third driving voltage VDDH. The control device 138 may control the fifth power conversion device 135 and the sixth power conversion device 136, respectively, so that the changed fifth driving voltage VGH and the changed sixth driving voltage VGL are output, respectively.

The above detailed description should not be construed as limiting in all respects and should be considered illustrative. The scope of the aspect should be determined by reasonable interpretation of the appended claims, and all changes within the equivalent range of the aspect are included in the scope of the aspect.

What is claimed is:

1. A power management device, comprising:

a first power conversion device configured to generate a first driving voltage and output the first driving voltage to a source driver for a display device;

a second power conversion device configured generate a second driving voltage and output the second driving voltage to the source driver; and a third power conversion device configured to generate a third driving voltage and output the third driving voltage to the source driver, wherein the first driving voltage is changed in a range of positive voltage and the second driving voltage is changed in a range of negative voltage, and wherein the third driving voltage is configured:

to be smaller than the first driving voltage and greater than the second driving voltage, and to be changed as a driving voltage at a point where a sum of a first power consumption due to the changed first driving voltage and a second power consumption due to the changed second driving voltage is the smallest.

2. The power management device of claim 1, wherein, when the third driving voltage is changed, the first driving voltage and the second driving voltage are each changed.

3. The power management device of claim 2, wherein, when the third driving voltage is changed to increase, the first driving voltage is changed to increase and an absolute value of the second driving voltage is changed to decrease.

4. The power management device of claim 2, wherein, when the third driving voltage is changed to decrease, the first driving voltage is changed to decrease and an absolute value of the second driving voltage is changed to increase.

5. The power management device of claim 1, wherein the third power conversion device comprises a low drop-output (LDO) regulator or a buck converter when the third driving voltage is changed to a positive voltage.

6. The power management device of claim 1, wherein, when the third driving voltage is changed to a positive voltage, the third driving voltage is shared with a core voltage provided to a timing controller.

7. The power management device of claim 1, wherein, when the third driving voltage is changed to a positive voltage, the third driving voltage is shared with an input/output voltage provided to a timing controller.

8. The power management device of claim 1, wherein, when the third driving voltage is changed to a negative voltage, the third power conversion device comprises a negative LDO regulator or an inverting buck-boost converter.

9. The power management device of claim 1, wherein, when the third driving voltage is changed to a negative voltage, the first driving voltage is shared with a system voltage, which is a power source for generating the third driving voltage.

10. The power management device of claim 1, wherein the first driving voltage, the second driving voltage, and the third driving voltage are power sources for generating a gamma voltage.

11. The power management device of claim 1, further comprising a fourth power conversion device configured to output a fourth driving voltage, wherein the fourth driving voltage is supplied to a common electrode of a display panel, and when the third driving voltage is changed, the fourth driving voltage is changed.

12. The power management device of claim 11, further comprising:

a fifth power conversion device configured to output a fifth driving voltage; and a sixth power conversion device configured to output a sixth driving voltage, wherein the fifth driving voltage and the sixth driving voltage are voltages for switching control of a driving transistor of a display panel, and wherein when the third driving voltage is changed, the fifth driving voltage and the sixth driving voltage are each changed.

13. A power management device, comprising:

a first power conversion device configured to generate a first driving voltage and output the first driving voltage to a source driver for a display device;

a second power conversion device configured to generate a second driving voltage and output the second driving voltage to the source driver;

a third power conversion device configured to generate a third driving voltage and output the third driving voltage to the source driver, third driving being smaller than the first driving voltage and greater than the second driving voltage; and a control device configured to control the first power conversion device, the second power conversion device, and the third power conversion device, wherein the first driving voltage is changed in a range of positive voltage and the second driving voltage is changed in a range of negative voltage, wherein the control device is configured:

to change the third driving voltage as a driving voltage at a point where a sum of a first power consumption due to the changed first driving voltage and a second power consumption due to the changed second driving voltage is the smallest, to change the first driving voltage and the second driving voltage based on the changed third driving voltage, and to control the first power conversion device, the second power conversion device, and the third power conversion device so that the changed first driving voltage, the changed second driving voltage, and the changed third driving voltage are output, respectively.

14. The power management device of claim 13, wherein when the third driving voltage is changed, the first driving voltage and the second driving voltage are each changed.

15. The power management device of claim 13, wherein, when the third driving voltage is changed to a positive voltage, the third power conversion device comprises a low drop-output (LDO) regulator or a buck converter.

16. The power management device of claim 13, wherein, when the third driving voltage is changed to a positive voltage, the third driving voltage is shared with at least one of the core voltage and input/output voltages provided to the timing controller.

17. The power management device of claim 13, wherein, when the third driving voltage is changed to a negative voltage, the third power conversion device comprises a negative LDO regulator or an inverting buck-boost converter.

18. The power management device of claim 13, wherein, when the third driving voltage is changed to a negative voltage, the first driving voltage is shared with a system voltage, which is a power source for generating the third driving voltage.

19. The power management device of claim 13, wherein the first driving voltage, the second driving voltage, and the third driving voltage are power sources for generating a gamma voltage.

20. The power management device of claim 13, further comprising a fourth power conversion device configured to output a fourth driving voltage, wherein the fourth driving voltage is supplied to a common electrode of a display panel, and wherein the control device is configured:

to change the fourth driving voltage based on the changed third driving voltage, and to control the fourth power conversion device so that the changed fourth driving voltage is output.

* * * * *